United States Patent [19]
Geston et al.

[11] Patent Number: 5,331,402
[45] Date of Patent: Jul. 19, 1994

[54] DITHER SIGNAL REMOVER FOR A DITHERED RING LASER ANGULAR RATE SENSOR UTILIZING AN ADAPTIVE DIGITAL FILTER

[75] Inventors: Douglas R. Geston, Minneapolis; Albert C. Hrovat, Shoreview, both of Minn.

[73] Assignee: Honeywell Inc., Minneapolis, Minn.

[21] Appl. No.: 280,106

[22] Filed: Dec. 5, 1988

[51] Int. Cl.$^5$ .............................................. G01C 19/68
[52] U.S. Cl. ........................................................ 356/350
[58] Field of Search ......................................... 356/350

[56] References Cited
U.S. PATENT DOCUMENTS

| | | | |
|---|---|---|---|
| 3,373,650 | 3/1968 | Killpatrick | 356/350 |
| 3,627,425 | 12/1971 | Doyle et al. | 356/350 |
| 4,248,534 | 2/1981 | Elbert | 356/350 |
| 4,344,706 | 8/1982 | Ljung et al. | 356/350 |
| 4,610,543 | 9/1986 | Ferriss | 356/350 |
| 4,790,658 | 12/1988 | Sewell | 356/350 |

OTHER PUBLICATIONS

"Adaptive Filter Theory", by Simon Haykin, McMaster University, 1986, pp. 194-244.

*Primary Examiner*—Samuel A. Turner

[57] ABSTRACT

Disclosed is an apparatus for removing the dither signal component from a dithered ring laser gyro output. Corresponding numerical representations of the gyro readout signal, a dither reference signal representative of the dithering of the sensor, and a corrective sensor output are stored for a plurality of discrete sample times. The gyro readout signal is modified by a dither correction signal to provide the corrected sensor output signal. The dither correction signal derived from the current dither reference signal and one or more pass values thereof which are signal processed by an adaptive filter having varying filter weights. The filter weights are updated after each sample time, and are updated in accordance with a preselected function of past values of the dither reference signal in order to minimize any dither signal component in the corrected sensor output signal.

8 Claims, 3 Drawing Sheets

DITHER SIGNAL REMOVER FOR A DITHERED RING LASER ANGULAR RATE SENSOR UTILIZING AN ADAPTIVE DIGITAL FILTER

FIELD OF THE INVENTION

This invention relates to ring laser angular rate sensors and specifically to sensors in which a dithering bias is used to minimize the effects of lock-in inherent in such sensors. More particularly, this invention relates to a mechanization for removing the dither signal from the sensor rotation output signal.

BACKGROUND OF THE INVENTION

The behavior of ring laser angular rate sensors, usually referred to as ring laser gyros, is well understood. Inherent in such sensors is the phenomena known as lock-in in which counter-propagating laser beams tend to lock together to a common frequency. The lock-in phenomena causes performance errors which have deleterious effects in navigational systems.

To avoid or reduce the effects of lock-in, the laser angular rate sensor may be biased by an alternating bias technique such as that shown and described in U.S. Pat. No. 3,373,650 issued in the name of J. E. Killpatrick. The alternating bias technique is usually referred to as dithering, and may be implemented by a variety of ways including electro-optical and mechanical schemes. Any of these schemes alter the frequency one or both of the counter-propagating laser beams. Since dithering, by either of these mentioned techniques, and the like, directly affects the behavior of the counter-propagating laser beams, the sensor readout signal will contain not only inertial rate information, but will also contain a signal component directly related to the dithering (alternating bias) of the sensor. This is true whether the sensor readout is mounted directly on the sensor (laser block mounted) or fixed to the sensor inertial platform (case mounted) like that shown in the aforementioned patent.

The signal contribution in the sensor readout signal due to dither is herein referred to as the dither signal component. For low noise navigational systems, the dither signal component in the readout signal generally needs to be minimized or removed to avoid control problems, particularly in block mounted readout systems.

Prior art solutions to remove the dither signal component include, among others, notch filters. However, such notch filters generate gain and phase shift disturbances which can affect the stability of control loops. Another solution utilizes a digital pulse subtraction technique as taught in U.S. Pat. No. 4,248,534, issued to Elbert.

A desirable solution is to remove the dither signal component by generating a correction signal which is substantially equivalent to the dither signal component. This latter approach is taught in U.S. Pat. No. 4,344,706 issued to Ljung et al. Ljung et al. teaches the use of a tracking circuit for tracking the clockwise and counter-clockwise components of dither rotation. These dither components are subtracted from the usual readout signal which is responsive to the counter-propagating laser beams of the sensor thereby providing a corrected readout signal.

Another dither signal stripper approach is an electronic dither compensator as taught in U.S. Pat. No. 4,610,543 issued to Ferriss. The Ferriss patent shows a feedback method of reducing the dither component from the gyro readout signal. In Ferriss, a dither correction signal is subtracted from the gyro readout signal to derive a corrected sensor output signal. Closed loop correction is provided by generating the dither correction signal as a function of a dither reference signal representative of the dithering or alternating bias. The relationship between the dither correction signal and the dither reference signal is a function of any dither signal component in the corrected sensor output signal.

BRIEF DESCRIPTION OF THE INVENTION

It is an object of the present invention to provide a dither signal compensator for a ring laser gyro which strips any dither signal component in the usual ring laser gyro readout to provide a corrected gyro output devoid of any dither signal component.

It is an object of the present invention to provide a dither signal compensator which may be implemented by digital signal processing techniques.

It is an object of the present invention to provide a dither signal compensator that adapts to any changes with time or temperature over the life of the gyro, as well as noise, distortions, and the like.

In the present invention, the dither signal component is removed from the usual ring laser output by use of a dither correction signal which is subtracted from the ring laser gyro readout, and which the dither correction signal is continuously modified through the employment of an adaptive filter operating on past and current values of a signal representative of the sensor bias caused by dithering the sensor.

In the preferred embodiment of a dithered ring laser gyro in accordance with the present invention, corresponding numerical representations of the gyro readout signal, a dither reference signal representative of the dithering of the sensor, and a corrected sensor output at discrete sample times are stored. The gyro readout signal is modified by a dither correction signal to provide the corrected sensor output signal. The dither correction signal is derived from the current dither reference signal and one or more past values thereof which are signal processed by an adaptive filter having varying filter weights. The filter weights are updated after each sample time, and are updated in accordance with a preselected function of past values of the dither reference signal and the corrected sensor output signal in order to minimize any dither signal component in the corrected sensor output signal.

DETAILED DESCRIPTION OF THE INVENTION

Figure 1:
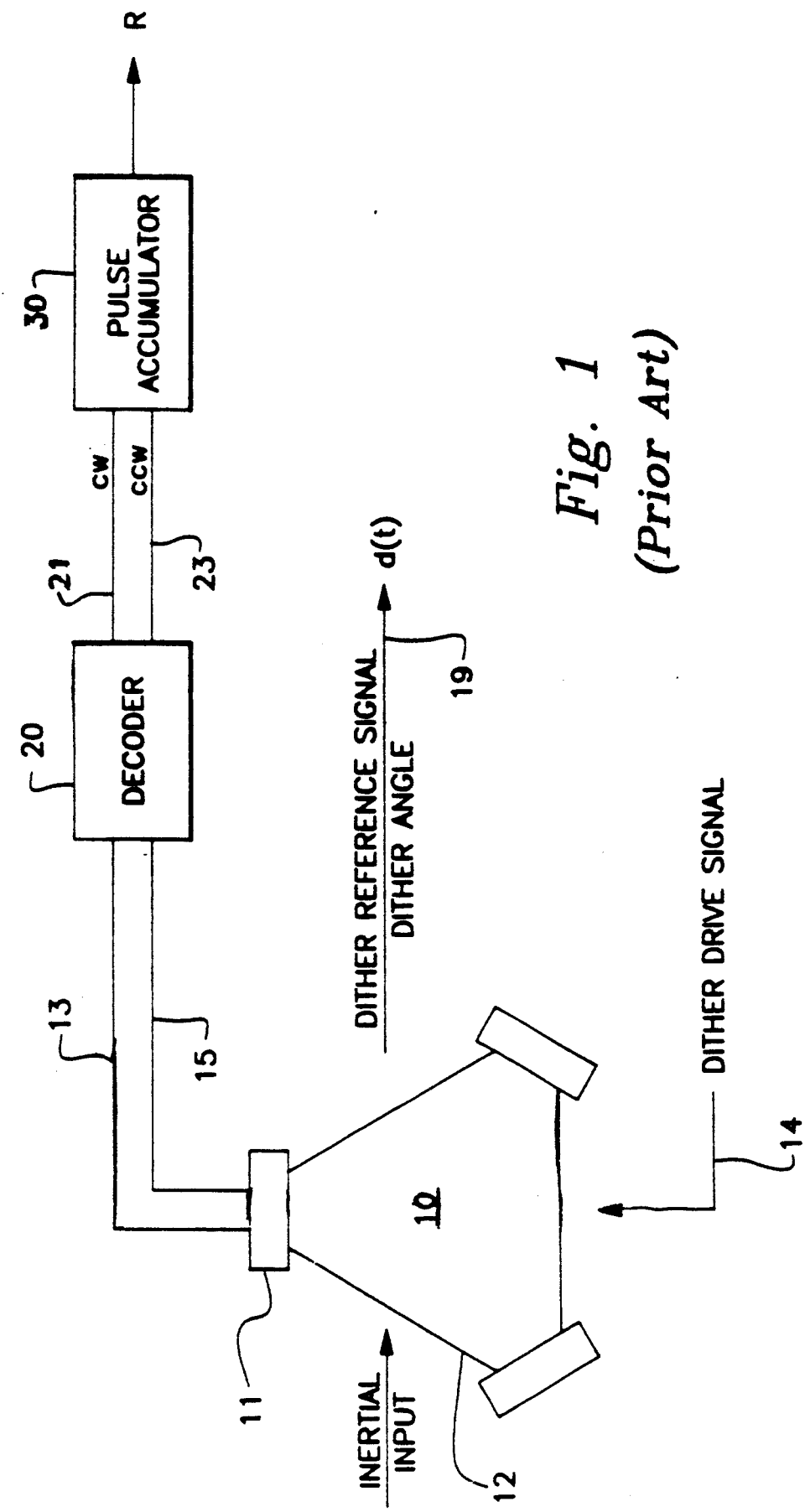
FIG. 1 is a schematic block diagram illustrating a ring laser gyro of the prior art.

Referring now to FIG. 1, there shown is a ring laser gyro like that shown in the aforementioned patents. Sensor 10 includes laser block 12 which provides a propagation path for counter-propagating laser beams.

Sensor 10 includes a dither mechanization (not shown) responsive to a dither drive signal 14, generally sinusoidal, for providing the dither or bias as previously described. For example, block 10 may be rotationally oscillated, as shown in the aforementioned patents. A dither spring (not shown) having piezoelectric devices attached thereto can operate in response to dither drive signal 14 to cause the spring to flex and cause block 12 to rotationally oscillate. Furthermore, a piezoelectric device may also be attached to the spring for providing a dither reference signal, identified as signal "d(t)" on signal line 19, having signal characteristics directly related to the actual dither motion of the sensor.

The just mentioned piezoelectric output signal "d(t)" is sometimes referred to as the "dither pick-off signal". Signal d(t) may represent either rotation angle or rate, but herein is preferably indicative of sensor block rotation angle relative to the inertial platform or case (not shown). The dither reference signal may be obtained by a variety of techniques depending upon the dither scheme that is selected (i.e. optical or mechanical).

U.S. Pat. No. 3,373,650, issued to Killpatrick describes a dither mechanization for rotational oscillations of the sensor block. An improved dither spring and drive mechanization is illustrated and described in U.S. Pat. No. 4,344,706, issued to Ljung et al. The latter patent also illustrates a mechanization for obtaining a dither reference signal representative of the sensor rotations caused by rotationally oscillating or dithering the sensor block. Further, U.S. Pat. No. 4,445,779, issued to Johnson, shows a dither drive signal and a means for obtaining a corresponding dither reference signal.

It should be noted that a diagram similar to FIG. 1 would be appropriate for describing an electro-optical alternating bias system using a Faraday cell, and the like.

A readout assembly 11 is generally mounted to laser block 12 and includes a means for optically combining a portion of the counter-propagating laser beams to provide an interference fringe pattern as is well known. Readout assembly also includes a pair of photo detectors (not shown) for providing output signals on signal lines 13 and 15 which are out of phase with each other, generally in phase quadrature. These signals are processed by a signal decoder 20 which in turn provides pulses on either signal line 21 indicating a clockwise rotation, or pulses on signal line 23 indicating counter-clockwise rotation of sensor 10. Each pulse generally represents a finite angular rotation of sensor 10. These pulses are counted by pulse accumulator 30 which provides an output signal R representative of the rotation angle of sensor 10. Pulse accumulator 30 responds, e.g., by counting up for CW pulses and counting down for CCW pulses.

Herein, signal R is the digital representation of the rotation of sensor 10 directly derived from the gyro readout interference fringes. It should be understood that either mechanical or optical biasing or dithering of the counter-propagating laser beams directly affects the number and rate of fringes which pass the photodetector and so directly affects readout signal R. Therefore, if the sensor is dithered in any manner as already described, then signal R will include a dither signal component.

Figure 2:
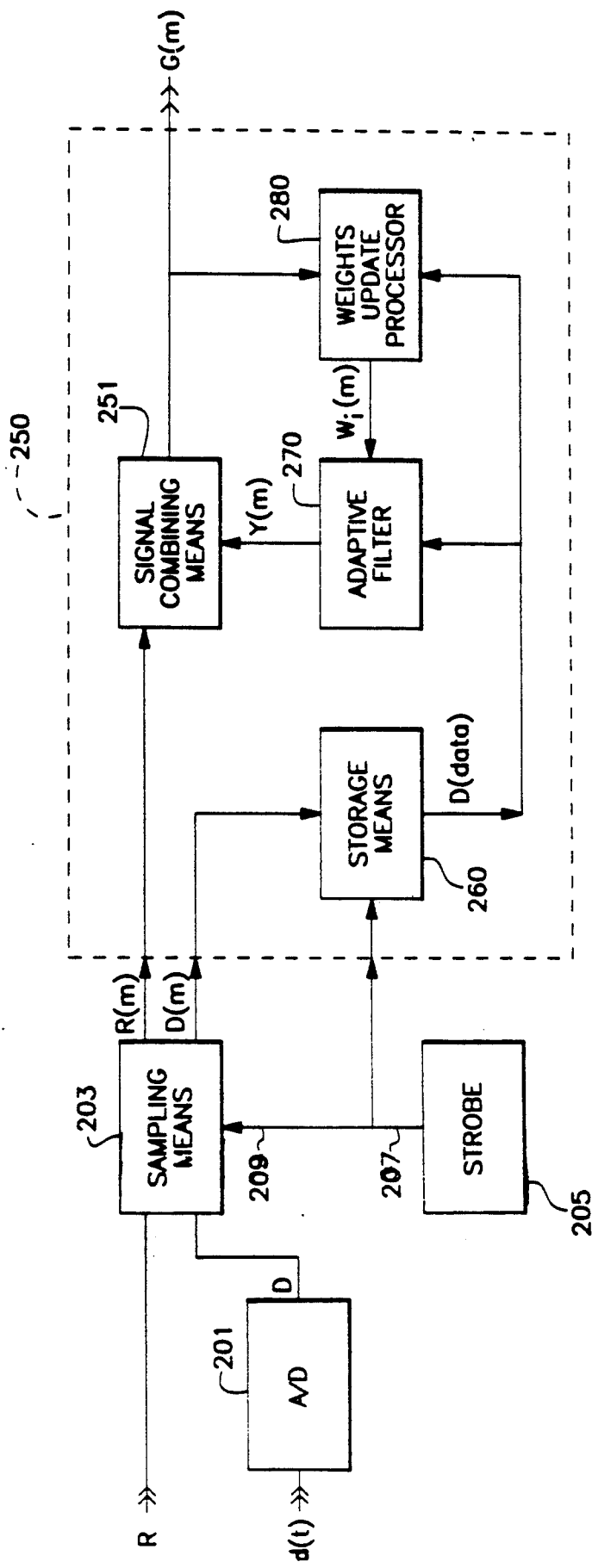
FIG. 2 is a schematic block diagram illustrating the present invention for removing any dither signal component from the ring laser gyro readout.

The dither compensator in accordance with the present invention is illustrated in FIG. 2. FIG. 2 illustrates a novel dither compensator which provides a closed loop dither compensator employing the use of an adaptive filter, e.g., a digital adaptive filter.

In the present invention, the dither reference signal d(t) is first converted into a digital signal D, and then signal processed by employment of an adaptive filter to generate the dither correction signal Y. The adaptive filter is modified in accordance with a selected function of the corrected sensor output signal and past values of the dither reference signal. The purpose of the adaptive filter is to adjust the dither correction signal Y derived from the dither reference signal D to more accurately reflect the actual dither signal component in the gyro readout signal R.

The dither compensator in accordance with the present invention collects dither reference signal data D(m) at discrete sample times. This same data is utilized in combination with the most recent corrected sensor output signal G to modify the relationship between the dither reference signal D and the dither correction signal Y in order to minimize any dither signal component in the corrected sensor output signal G. Thus, the corrected sensor output signal G is representative of the true inertial rotation input which the sensor is intended to measure.

Referring now more particularly to the schematic block diagram illustrated in FIG. 2, the dither reference signal d(t) is first converted into a digital signal D by A/D converter 201. Sampling means 203 provide as a means for simultaneously holding corresponding digital values R and D for discrete sample times. Sampling means 203 is shown to be controlled by strobe 205 having an output strobe signal 207 which is presented to the strobe input 209 of sampling means 203.

Strobe 205 generally may be a simple clock pulse signal or the like having a frequency on the order of three time greater than the dither drive signal frequency. Generally, the dither drive signal frequency is on the order of several hundred hertz.

The output of sampling means 203 is illustrated to have output signals R(m) and D(m) which represent the corresponding values of signals R and D at the same sample time "m". Herein, sample times "m+1" and "m−1" correspond to those sample times after and before the "m"th sample time, respectively.

Signals R(m) and D(m), and the strobe signal 207 are provided as inputs to a central processing unit 250. For each strobe cycle or pulse, central processing unit 250 provides an output signal G(m) from signal combining means 251 which subtracts a correction signal Y(m) from the gyro readout signal R(m) for providing signal G(m).

Central processing unit 250 includes a storage means 260 for providing storage of at least a selected number of samples "N" of the dither reference signal samples D(m) for N successive sample times separated by a fixed time difference. The N-samples of the dither reference signal are figuratively provided on signal line 263 and are identified as signal D(data). It should be understood that signal line 263 may be a data bus of a digital signal processor. It should also be understood that storage means 260 may be considered a data storage array for holding samples:

$$D(data) = D(m), D(m-1), \ldots D(m-N+1) \tag{1}$$

For successive input samples, the samples may shift through the data storage array, and the oldest data drops out.

D(data) is provided to the adaptive weighted filter 270 and weights update processor 280. Weights update processor 280 operates on D(data) and the last sample of the corrected sensor output G(m) for providing adaptive filter-weights $W_i(m)$ in a manner to be described.

Adaptive filter 270 combines the dither reference data, D(data), and the adaptive filter-weights, $W_i(m)$, for providing correction signal Y(m) which is presented to signal combining means 251.

In combination, adaptive filter 270 and weights update processor 280 provide what is generally referred to as an "adaptive digital filter." Adaptive filter 270 provides the correction signal Y(m) in accordance with the following mathematical expression:

$$Y(m) = \sum_{i=1}^{N} W_i(m) * [D(m - i + 1)] \quad (2)$$

Weights update processor operates on D(data) for providing updated filter weights after each strobe cycle in accordance with the following mathematical expressions:

For i=1, ... N $$U(m) = \frac{\alpha}{\sum_{i=1}^{N} [D(m - i + 1)]^2} \quad (3)$$

$$W_i(m) = W_i(m-1) + U(m-1), D(m-i) G(m-1) \quad (4)$$

$$\alpha = \text{selected constant } (0 < \alpha < 2) \quad (5)$$

Signal combining means 251, in turn calculates the corrected sensor output signal:

$$G(m) = R(m) - Y(m) \quad (6)$$

Where $W_i$ are filter-weights, the factor U(m) is the adaptation rate coefficient which is a function of the sum of the squares of the discrete values of D.

The above mathematical description describes an adaptive digital filter using the least means squared adaptation technique by B. Widrow, et al. described in the publications, "Adaptive Switching Circuits, IRE Wescon Conv. Rec., Part IV, 1960, pp. 96–104; and "Adaptive Filters," in R. E. Kalman and N. DeClaris, eds., "Aspects of Network and Systems Theory", Holt, Reinhardt and Winston, New York.

Central processing unit 250 may be in part a computer or micro-processor for executing the necessary operations on the data to provide the corrected sensor output signal G(m).

Figure 3:
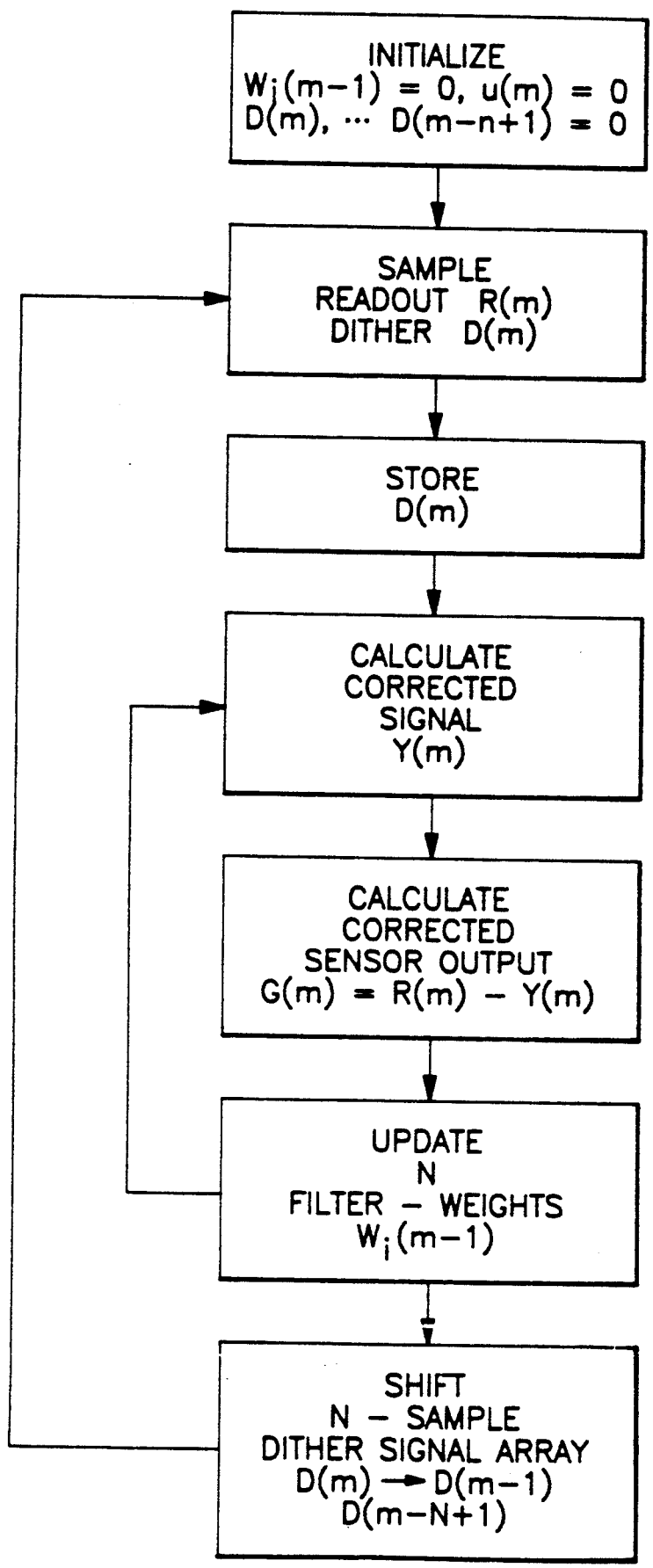
FIGS. 3 is flow diagram of an implementation of the invention illustrated in FIG. 2.

FIG. 3 is a brief flow diagram illustrating the steps for providing the corrected sensor output signal G(m) substantially devoid of the dither signal component.

It should be understood by those skilled in the art that strobe 205, accumulator 30, decoder 20, and sampling means 203 may be implemented by a wide variety of analog and/or digital circuits for performing the intended function of concurrently sampling the dither reference signal D and the gyro readout signal R, this invention, of course, is not limited to the embodiment illustrated in the accompanying Figure.

As should be recognized by those skilled in the art, the adapted digital filter employing the least means squared algorithm illustrates only one possible control algorithm of the present invention, among many others, in which past values of the dither reference signal D(m) are filtered to arrive at the current dither correction signal Y(m).

All of the above cited patents and publications are herein incorporated by reference.

While only preferred embodiments of the invention have been shown and described, it is intended that this invention be interpreted as contemplating any variations which are within the true spirit and scope of the present invention.

The embodiments of an invention in which an exclusive property or right is claimed are defined as follows:

1. A dithered angular rate sensor comprising:
    means for generating counter-propagating waves along a closed-loop path, each of said waves having a frequency related to the rotation of said sensor;
    means for dithering the frequency of at least one of said waves;
    means for producing a dither reference signal related to said dithering;
    readout means responsive to said waves for producing a readout signal indicative of rotation of said sensor, said readout signal including a dither signal component due to said dithering;
    adaptive filter means utilizing a plurality of filter-weights for converting said dither reference signal to a dither correction signal, said adaptive filtering means operating on a plurality of discrete values of said dither reference signal occurring at discrete sample times;
    means for subtracting said dither correction signal from said readout signal to provide a corrected sensor output signal; and
    means for providing said filter-weights as a function of selected past values of said dither reference signal and at least one past value of said corrected sensor output signal.

2. The sensor of claim 1 wherein said dither correction signal may be mathematically described by:
    $Y(m) = W_i(m) * [D(m-i+1)]$ where
    N = a selected number of discrete samples,
    m = $m^{th}$ discrete sample time,
    $W_i(m)$ = said filter weights as a function of said dither reference signal discrete values for N previous sample times and at least one part value of said corrected sensor output signal,
    D(mth) = said dither reference signal discrete values at said mth sample time.

3. A dithered angular rate sensor comprising:
    means for generating counter-propagating waves along a closed-loop path, each of said waves having a frequency related to the rotation of said sensor;
    means for dithering the frequency of at least one of said waves;
    first means responsive to said dithering for producing a dither reference signal D related to said dithering;
    readout means responsive to said waves for producing a readout signal R representative of the rotation of said sensor, said readout signal including a dither signal component due to said dithering;
    second means for producing a corrected sensor output signal G, where signal G is the difference between said readout signal R and a dither correction signal Y;
    mean or concurrently sampling said signals R, D, and G at discrete sample times;

means for storing an array of N discrete numerical representations of the value of said signal D corresponding to N successive ones of said discrete sample times;

third means for calculating a plurality of N-filter-weights $W_i$ as a function of the last sample signal G and selected ones of said array of numerical representations of signal D; and fourth means for calculating said correction signal Y as a function of said N-filter-weights and said array of numerical representations of said signal D.

4. The sensor of claim 3 wherein said dither correction signal may be mathematically described by:

$$Y(m) = W_i(m) * [D(m-i+1)]$$

where
N = a selected number of discrete samples,
m = $m^{th}$ discrete sample time,
$W_i(m)$ = said filter weights as a function of said dither reference signal discrete numerical representations for N previous sample times,
D(th) = said dither reference signal discrete numerical representation at said mth sample time.

5. A dithered angular rate sensor comprising:
means for generating counter-propagating waves along a closed-loop path, each of said waves having a frequency related to the rotation of said sensor;

means for dithering the frequency of at least one of said waves;

first means responsive to said dithering for producing an analog dither reference signal related to said dithering;

readout means responsive to said waves for producing a readout signal R representative of the rotation of said sensor, said readout signal including a dither signal component due to said dithering;

second means for producing a corrected sensor output signal G, where signal G is the difference between said readout signal R and a correction output signal Y;

means for converting said analog dither reference signal to a digital dither reference signal;

adaptive digital filter means utilizing a plurality of filter-weights for operating on a plurality of discrete values of said digital dither reference signal occurring at discrete sample times to provide a dither correction signal Y; and means for providing said digital filter with filter-weights calculated as a function of selected past values of said dither reference signal and at least a selected one of past values of said corrected sensor output signal.

6. The sensor of claim 1 wherein said dither correction signal may be mathematically described by:

$$Y(m) = W_i(m) * [D(m-i+1)]$$

where
N = a selected number of discrete samples,
m = $m^{th}$ discrete sample time,
$W_i(m)$ = said filter weights as a function of said dither reference signal discrete values for N previous sample times and at least one past value of said corrected sensor output signal,
D(mth) = said dither reference signal discrete values at said mth sample time.

7. The apparatus of claim 5 wherein said adaptive digital filter functions in accordance with a least means squared algorithm.

8. A dithered angular rate sensor comprising:
means for generating counter-propagating waves along a closed-loop path, each of said waves having a frequency related to the rotation of said sensor;

means for dithering the frequency of at least one of said waves;

first means responsive to said dithering for producing an analog dither reference signal related to said dithering;

readout means responsive to said waves for producing a readout signal R representative of the rotation of said sensor, said readout signal including a dither signal component due to said dithering;

second means for producing a corrected sensor output signal G, where signal G is the difference between said readout signal R and a correction output signal Y;

means for converting said analog dither reference signal to a digital dither reference signal;

adaptive digital filter means utilizing at least one filter-weight for operating on at least one discrete value of said digital dither reference signal occurring at a discrete sample time to provide a dither correction signal Y; and means for providing said digital filter with filter-weights calculated as a function of at least one selected past value of said dither reference signal and at least a selected one of past values of said corrected sensor output signal.

* * * * *